US012650338B2

(12) United States Patent
Tong et al.

(10) Patent No.: US 12,650,338 B2
(45) Date of Patent: Jun. 9, 2026

(54) AUTO-FOCUS SPECTROMETER

(71) Applicants: ZOLIX INSTRUMENTS Co., Ltd.,
Beijing City (CN); Zolix Analytical
Instruments Co., Ltd, Beijing (CN)

(72) Inventors: Fei Tong, Beijing (CN); Wenjuan
Peng, Beijing City (CN); Zemin Lei,
Beijing City (CN); Suxia Zhang,
Beijing City (CN); Tianyun Tang,
Beijing City (CN)

(73) Assignees: ZOLIX INSTRUMENTS Co., Ltd.,
Beijing City (CN); Zolix Analytical
Instruments Co., Ltd., Beijing (CN)

( * ) Notice: Subject to any disclaimer, the term of this
patent is extended or adjusted under 35
U.S.C. 154(b) by 135 days.

(21) Appl. No.: 18/754,612

(22) Filed: Jun. 26, 2024

(65) Prior Publication Data

US 2025/0027812 A1 Jan. 23, 2025

(30) Foreign Application Priority Data

Jul. 18, 2023 (CN) .......................... 202310878354.5

(51) Int. Cl.
*G01J 3/02* (2006.01)
*G01J 3/18* (2006.01)
*G01J 3/28* (2006.01)
(52) U.S. Cl.
CPC .......... *G01J 3/0237* (2013.01); *G01J 3/0208*
(2013.01); *G01J 3/18* (2013.01); *G01J 3/2823*
(2013.01)
(58) Field of Classification Search
CPC .......... G01J 3/0237; G01J 3/0208; G01J 3/18;
G01J 3/2823; G01J 3/0291; G01J 3/04
(Continued)

(56) References Cited

U.S. PATENT DOCUMENTS 5,444,224 A * 8/1995 Miyamoto ................ G11B 7/14
7,652,765 B1 * 1/2010 Geshwind ............. G01J 3/2823
356/330
(Continued)

FOREIGN PATENT DOCUMENTS

CN 102778293 A 11/2012
CN 103592028 A 2/2014
(Continued)

OTHER PUBLICATIONS

Search report issued on Aug. 11, 2023 for counterpart Chinese
patent application No. 202310878354.5 with machine EN transla-
tion (4 pages).

(Continued)

*Primary Examiner* — Md M Rahman
(74) *Attorney, Agent, or Firm* — Nutter McClennen &
Fish LLP

(57) ABSTRACT

The present disclosure provides an auto-focus spectrometer,
including: a grating element configured to split light; an
imaging element configured to converge a light beam; a
controller configured to move the imaging element to realize
autofocus, and connected to the imaging element; and a
detector; and an incident light is diffracted through the
grating to the imaging element, and then converged to the
detector through the imaging element to obtain spectrogram
information. The present disclosure automatically adjusts
the imaging element position according to the configuration
and operation state of the spectrometer, so that the spec-
trometer can be automatically kept at an optimal imaging
position and exert the best performance thereof.

5 Claims, 3 Drawing Sheets

(58) Field of Classification Search
USPC ......................................................... 356/326
See application file for complete search history.

(56) References Cited

U.S. PATENT DOCUMENTS

| | | | |
|---|---|---|---|
| 10,082,426 B2 | 9/2018 | Haldane et al. | |
| 10,663,404 B1 * | 5/2020 | Babnick | G01J 3/443 |
| 2005/0243312 A1 * | 11/2005 | Geshwind | G01J 3/2846 |
| | | | 356/330 |
| 2006/0176480 A1 * | 8/2006 | Toth | G01J 3/06 |
| | | | 356/328 |
| 2011/0149245 A1 * | 6/2011 | Barth | A61B 3/1005 |
| | | | 351/215 |
| 2014/0043469 A1 * | 2/2014 | Engel | G02B 21/025 |
| | | | 348/135 |
| 2017/0184833 A1 * | 6/2017 | Okamoto | G01J 3/0208 |
| 2017/0211974 A1 * | 7/2017 | Haldane | G01J 3/0275 |
| 2021/0330184 A1 * | 10/2021 | Frisken | G01J 3/4406 |
| 2022/0082435 A1 * | 3/2022 | Sobron | G01J 3/021 |

FOREIGN PATENT DOCUMENTS

| | | |
|---|---|---|
| CN | 105547478 A | 5/2016 |
| CN | 114279570 A | 4/2022 |
| CN | 115326199 A | 11/2022 |
| CN | 115597711 B | 3/2023 |
| GB | 2543719 B | 4/2020 |
| WO | 2005024362 A1 | 3/2005 |
| WO | 2016012794 A2 | 1/2016 |

OTHER PUBLICATIONS

Extended European Search Report issued on Oct. 17, 2024 for counterpart European patent application No. 24176312.7 (7 pages).

* cited by examiner

AUTO-FOCUS SPECTROMETER

CROSS-REFERENCE TO RELATED APPLICATION

This application claims priority to Chinese Invention patent application No. 202310878354.5, entitled 'AUTO-FOCUS SPECTROMETER', and filed on Jul. 18, 2023, which is hereby incorporated by reference in its entirety.

TECHNICAL FIELD

The present disclosure relates to the technical field of optical instruments, and particularly to an auto-focus spectrometer.

BACKGROUND

A spectrometer is an instrument used to measure light characteristics, and it is usually equipped with a detector that can convert an optical signal into an electrical signal. In addition to adapt a single-point detector (photomultiplier), a linear array CCD (Charge-coupled Device) or area array CCD may also be adapted to collect more information at one time. The spectrometer has a variety of different design optical paths, such as the classic Czerny-Turner optical path, Ebert-Fastie optical path, etc., and various optical path systems upgraded and improved on the basis of these architectures. Regardless of the type of the optical path, the basic principle of the spectrometer is the same: after being incident from a slit, light is collimated and incident onto a dispersion element, and the dispersion element separates different wavelength components of the light and collects the required wavelength components; the collected light is then incident onto a focusing element (lens or reflector), and finally imaged on a sensitized face of the CCD, so as to be collected and analyzed after being converted into digital signals.

In general, the dispersion element of the spectrometer adopts diffraction grating. Different scribed lines of diffraction gratings represent different light splitting capabilities. The grating with low scribed lines can cover a wider spectral range than the grating with high scribed lines, but the resolution is reduced. In addition, the diffraction grating blazes at a specific angle, i.e., reflects light at a highest efficiency. Therefore, it is important to select the grating with an appropriate blazed wavelength and scribed lines for a spectral range to be detected. In order to meet the requirement of high resolution, the grating with high scribed lines is usually needed to detect the spectral signal.

Due to the limitations of the mechanical structure and optical path, the grating of the spectrometer generally has a usable rotation angle range, and the grating with high scribed lines usually cannot obtain long-wavelength information. In addition, because the sensitized face of CCD is constant, the CCD can detect different spectral ranges through the grating rotation angle, so the grating is rotatable in the spectrometer. Moreover, upon the demand for the gratings with high and low scribed lines, the spectrometer is also provided as a multi-grating structure, regardless of a quick-disassembly and quick-assembly mode or a multi-grating turret switching mode.

In order to obtain the best test effect of the spectrometer, the detector must be placed at an optimal imaging position (or called as a focus) of the spectrometer as much as possible, and it is usually adjusted and fixed at a possibly optimal position before leaving the factory. Because the spectrometer is a sensitive instrument, once it is disturbed, a defocus problem will occur, so that additional manpower and time will be spent for adjustment.

In addition to mechanical deviations, there are other factors that makes it extremely difficult to achieve an optimal focus position of the spectrometer in practice. Firstly, when the grating rotation angle is different, the optical aberration will change as a whole, and the optimal focus position will also actually change. Secondly, the spectrometer may have a plurality of light source entrances or detector exits, and the changes of these positions will also affect the optimal focus position of the spectrometer. Finally, there is a problem of consistency of gratings, i.e., even the gratings with the same scribed lines still have slight differences in surface flatness and surface morphology due to the limitation of the processing level, and the gratings with different scribed lines, different manufacturers and different batches will have more significant differences, which seriously affects the performance consistency of the spectrometer.

SUMMARY

The embodiments of the present disclosure mainly aim to provide an auto-focus spectrometer, which automatically adjusts an imaging element position based on the configuration and operation state of the spectrometer, so that the spectrometer can be automatically kept at an optimal imaging position and exert the best performance thereof.

In order to achieve the above objective, an embodiment of the present disclosure provides an auto-focus spectrometer, including a grating element configured to split light, an imaging element configured to converge a light beam, a controller configured to move the imaging element to realize autofocus and connected to the imaging element, and a detector. An incident light is diffracted through the grating to the imaging element, and then converged to the detector through the imaging element to obtain spectrogram information.

In an embodiment, the auto-focus spectrometer further includes a collimating element configured to collimate light. The incident light is collimated through the collimating element and then reflected to the grating In an embodiment, the auto-focus spectrometer further includes a spectrometer housing. The collimating element, the grating element, the imaging element and the controller are provided in the spectrometer housing, and the detector is provided on the spectrometer housing.

In an embodiment, the auto-focus spectrometer further includes at least one incident slit and at least one outgoing slit that are provided on the spectrometer housing. The incident light enters the collimating element through one of the at least one incident slit and enters the detector through one of the at least one outgoing slit.

In an embodiment, the auto-focus spectrometer further includes a linear sliding table on which the imaging element is mounted.

In an embodiment, the linear sliding table is in a direction that is consistent with an optical path direction of the imaging element.

In an embodiment, the auto-focus spectrometer further includes: an entrance optical element configured to allow the light passing through the incident slit to enter the collimating element, and includes an exit optical element configured to allow the light from the imaging element to enter the detector through the outgoing slit.

In an embodiment, the controller is specifically config-
ured to:

acquire grating rotation angle data, a position of the
entrance optical element and a position of the exit
optical element;

determine a rotation angle position graph based on the
position of the entrance optical element and the posi-
tion of the exit optical element;

determine an optimal imaging element position from the
rotation angle position graph based on the grating
rotation angle data; and move the imaging element according to the optimal
imaging element position to realize autofocus.

In an embodiment, the controller is further configured to:

acquire a light full width at half maximum of the spec-
trogram information at each grating rotation angle and
a corresponding imaging element position;

construct a relationship curve between the full width at
half maximum and the imaging element position based
on the light full width at half maximum and the
corresponding imaging element position, to determine
the optimal imaging element position at each grating
rotation angle; and construct the rotation angle position graph according to
the optimal imaging element position at each grating
rotation angle.

In an embodiment, the grating element is a planar grating,
or a grating turret including a plurality of gratings.

The auto-focus spectrometer according to the embodi-
ments of the present disclosure includes a grating element
configured to split light, an imaging element configured to
converge a light beam, a controller configured to move the
imaging element to realize autofocus, and a detector. It is
possible to automatically adjust the imaging element posi-
tion based on the configuration and operation state of the
spectrometer, so that the spectrometer can be automatically
kept at an optimal imaging position and exert the best
performance thereof.

BRIEF DESCRIPTION OF THE DRAWINGS

In order to explain the technical solutions in the embodi-
ments of the present disclosure or in the prior art more
clearly, the drawings to be used in the description of the
embodiments will be briefly introduced below. Obviously,
the drawings in the following description only illustrate
some embodiments of the present disclosure, and those of
ordinary skill in the art may obtain other drawings from
these drawings without paying any creative effort.

DESCRIPTION OF EMBODIMENTS

The technical solutions in the embodiments of the present
disclosure will be clearly and completely described below
with reference to the drawings. Obviously, those described
are only a part, rather than all, of the embodiments of the
present disclosure. Based on the embodiments in the present
disclosure, any other embodiment obtained by those of
ordinary skill in the art without paying any creative labor
should fall within the protection scope of the present dis-
closure.

When the spectrometer is in use, the detector must be in
an optimal focus position as far as possible to fully exert the
performance of the spectrometer and obtain accurate and
reliable test data. However, due to the error of the mechani-
cal assembly of the spectrometer, various configuration
characteristics of the spectrometer, such as a plurality of
gratings and a plurality of entrances and exits, affect the
optimal focusing (imaging) effect of light on the detector.
Therefore, the present disclosure proposes a spectrometer
with an imaging element capable of automatically adjusting
its position.

Figure 1:
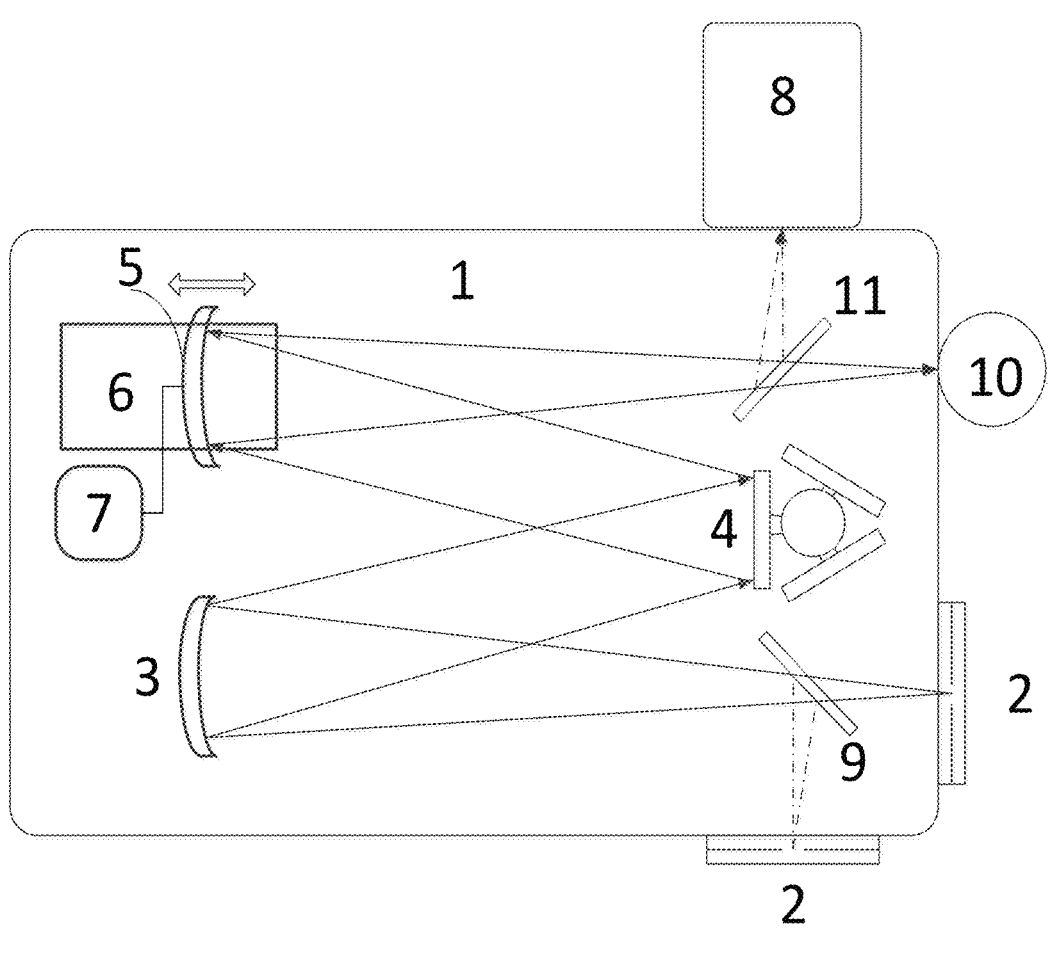
FIG. 1 illustrates a schematic diagram of an auto-focus
spectrometer according to an embodiment of the present
disclosure.
Figure 2:
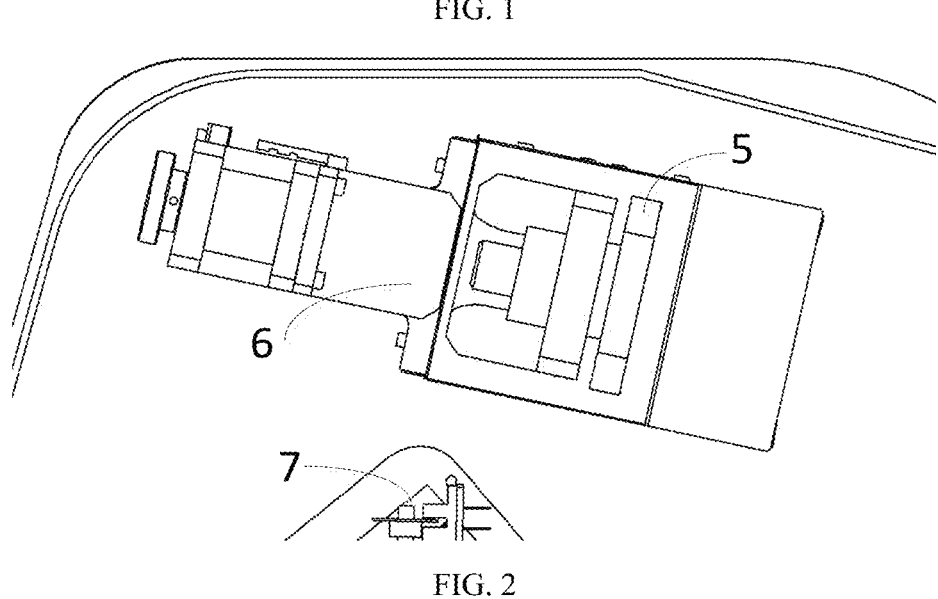
FIG. 2 illustrates a partial cross-sectional view of an
imaging element according to an embodiment of the present
disclosure.

FIG. 1 illustrates a schematic diagram of an auto-focus
spectrometer according to an embodiment of the present
disclosure. FIG. 2 illustrates a partial cross-sectional view of
an imaging element according to an embodiment of the
present disclosure. As illustrated in FIGS. 1 and 2, an
auto-focus spectrometer includes:

a grating element 4 configured to split light, which serves
as a dispersion element, is an easily replaceable plug-
gable planar grating or a grating turret including a
plurality of gratings; the grating generally configures
with the diffraction of +1 level; the turret is rotatable to
cause a grating to rotate at different angles, so as to
change the range of wavelengths output to the surface
of the detector, and meanwhile, switch to a different
grating as needed;

an imaging element 5 configured to converge a light
beam, which may be a spherical mirror or an aspherical
mirror;

a controller 7 configured to move the imaging element 5
to realize autofocus, and
connected to the imaging element 5; and a detector, which may include a first detector 8 and a
second detector 10.

Incident light is diffracted through the grating element 4
to the imaging element 5, and then converged to the detector
through the imaging element 5 to obtain spectrogram infor-
mation.

In an embodiment, the auto-focus spectrometer further
includes a linear sliding table 6. The imaging element 5 is
mounted on the linear sliding table 6, and the imaging
element 5 may be controlled by the controller 7 to move
back and forth.

In this embodiment, the linear sliding table 6 is in a
direction that is consistent with an optical path direction of
the imaging element 5, so that the optimal focus position
coincides with the photosensitive surface of the detector.
Since the spectrometer is precise, the linear sliding table 6
where the imaging element 5 is located should be a high-
precision sliding table with a minimum moving step in the
order of um.

In an embodiment, the auto-focus spectrometer further
includes a collimating element 3 configured to collimate
light, which is generally a spherical mirror or an aspherical
mirror and may be selected based on a designed focal length.

The incident light is collimated through the collimating element 3 and then reflected to the grating element 4.

In an embodiment, the auto-focus spectrometer further includes a spectrometer housing.

The collimating element 3, the grating element 4, the imaging element 5 and the controller 7 are provided in the spectrometer housing, and the detector is provided on the spectrometer housing. The detector fixed on the spectrometer housing does not need a flange with a complicated structure that is used to move the detector for focusing, so that it is unnecessary to manually adjust the detector, and the autofocus is more accurate.

In an embodiment, the auto-focus spectrometer further includes:

at least one incident slit 2 and at least one outgoing slit provided in the spectrometer housing.

The incident light enters the collimating element 3 through one of the at least one incident slit 2 and enters the detector through one of the at least one outgoing slit.

If there are a plurality of slits, the auto-focus spectrometer further includes:

an entrance optical element 9 configured to allow the light passing through the incident slit 2 to enter the collimating element 3; and an exit optical element 11 configured to allow the light from the imaging element 5 to enter the detector through the outgoing slit.

In this embodiment, the entrance optical element 9 and the exit optical element 11 may be planar mirrors, and the used entrance and exit may be adjusted by controlling the entrance optical element 9 or the exit optical element 11. The two entrances may be mounted with different light sources, and the two exits may be mounted with different detectors, or the mirrors may be replaced with beam splitters, so that the two detectors can detect signals at the same time.

As mentioned above, there are many factors in the spectrometer which cause the spectrometer not to be in the optimal focus position, and it is impossible to make a manual adjustment every time of use. According to the present disclosure, the position of the imaging element is automatically controlled, so that a precise displacement adjustment can be made along an optical path direction: when the grating rotates to a different angle (i.e., at a different wavelength) and the spectrometer selects a different grating or selects different positions of the entrance and the exit, the controller may control the imaging element to move to a corresponding optimal focus position, so that the spectrometer is substantially located in an optimal test state. In order to realize this function, it is necessary to construct a physical model of a relationship between the optimal focus position and the position of the sliding table where the imaging element is located. When the parameters of this model are determined, the spectrometer can realize the function of autofocus. The specific process is as follows:

1. Acquiring a light full width at half maximum of the spectrogram information at each grating rotation angle and a corresponding imaging element position.

Figure 3:
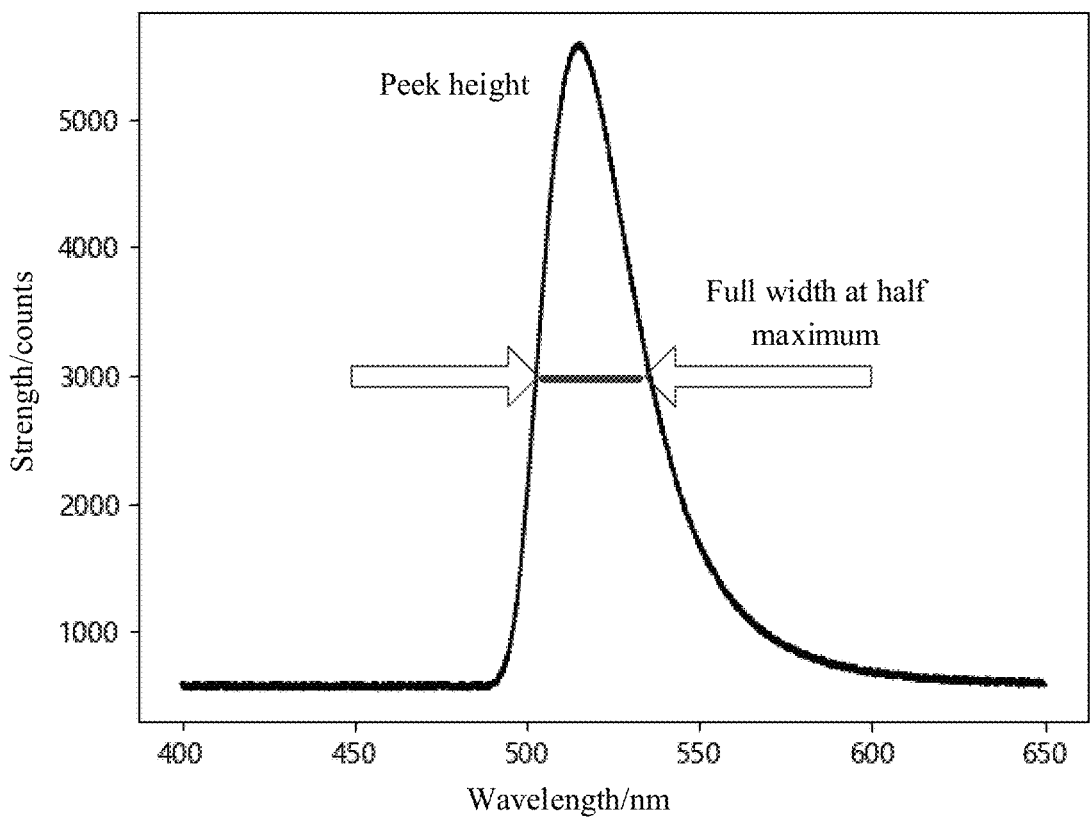
FIG. 3 illustrates a schematic diagram of a characteristic
peak distribution according to an embodiment of the present
disclosure.
Figure 4:
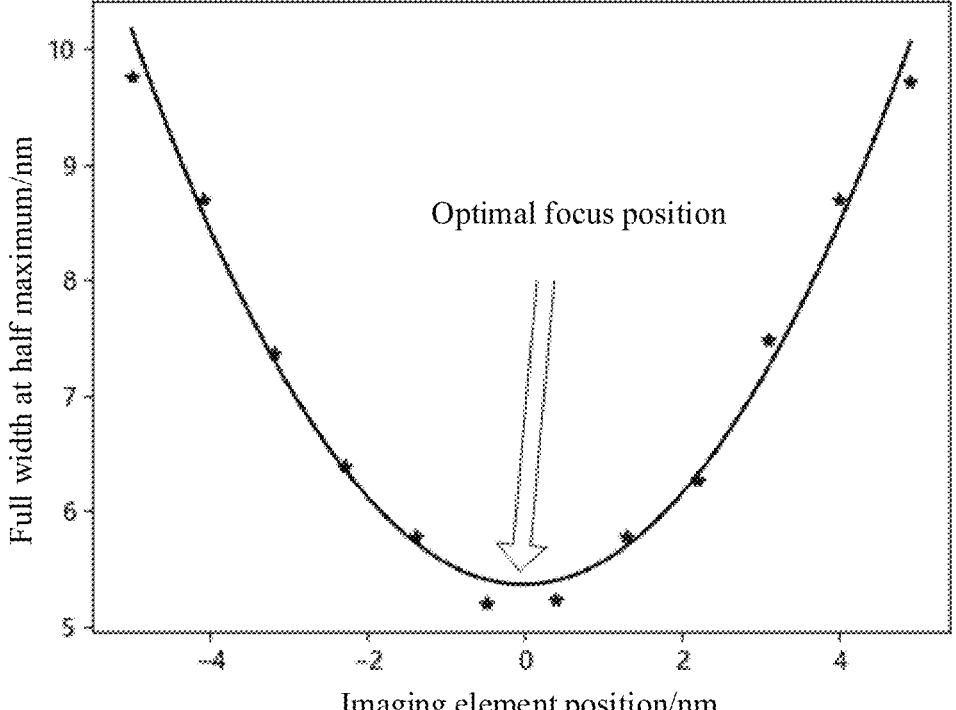
FIG. 4 illustrates a schematic diagram of a relationship
between an imaging element position and a full width at half
maximum of a characteristic peak according to an embodi-
ment of the present disclosure.

FIG. 3 illustrates a schematic diagram of a characteristic peak distribution according to an embodiment of the present disclosure. FIG. 4 illustrates a schematic diagram of a relationship between an imaging element position and a full width at half maximum of a characteristic peak according to an embodiment of the present disclosure. As illustrated in FIGS. 3 and 4, a typical characteristic peak detected by a detector is an asymmetric shape, which is caused by an optical aberration of the spectrometer. Different wavelengths lead to different manifestations, and the asymmetry caused by the aberration increases as the degree of defocus increases. When the imaging element is in an optimal focal length position, the full width at half maximum of the characteristic peak is the smallest, and this index is selected to evaluate the imaging effect. Although the full width at half maximum of the peak is used as the index to evaluate the imaging effect in the above process, other indexes of the peak, such as a peak height, a peak area, or a combination of a plurality of indexes may also be used. For example, the imaging effect improves as the peak height increases.

2. Constructing a relationship curve between the full width at half maximum and the corresponding imaging element position based on the light full width at half maximum and the corresponding imaging element position, to determine an optimal imaging element position at each grating rotation angle.

During the implementation, the controller is used to move the imaging element at a plurality of positions to test the spectrum and calculate the full width at half maximum of the characteristic peak, both of which are recorded and used to draw a curve, and the relationship therebetween can be seen from FIG. 4. When the full width at half maximum is the smallest, there is an optimal focal length position. Generally, the selected position is not exactly the optimal focal length position, so it is necessary to perform polynomial fitting on the data and find an extreme point to obtain the required focal length position. The points in FIG. 4 are measured values, and the curve is obtained by performing second-order polynomial fitting on the data points. Three coefficients a, b and c can be obtained by fitting, which are corresponding to a second-order coefficient, a first-order coefficient and a constant term respectively. According to a mathematical formula, the extreme point can be obtained as $x=(-b+\sqrt{(b^2-4ac)})/2a$. In order to improve the accuracy, a polynomial of the third or higher order may also be selected for fitting, and then the extreme point is obtained by a computer with a mathematical optimization algorithm.

3. Constructing a rotation angle position graph according to the optimal imaging element position at each grating rotation angle.

Figure 5:
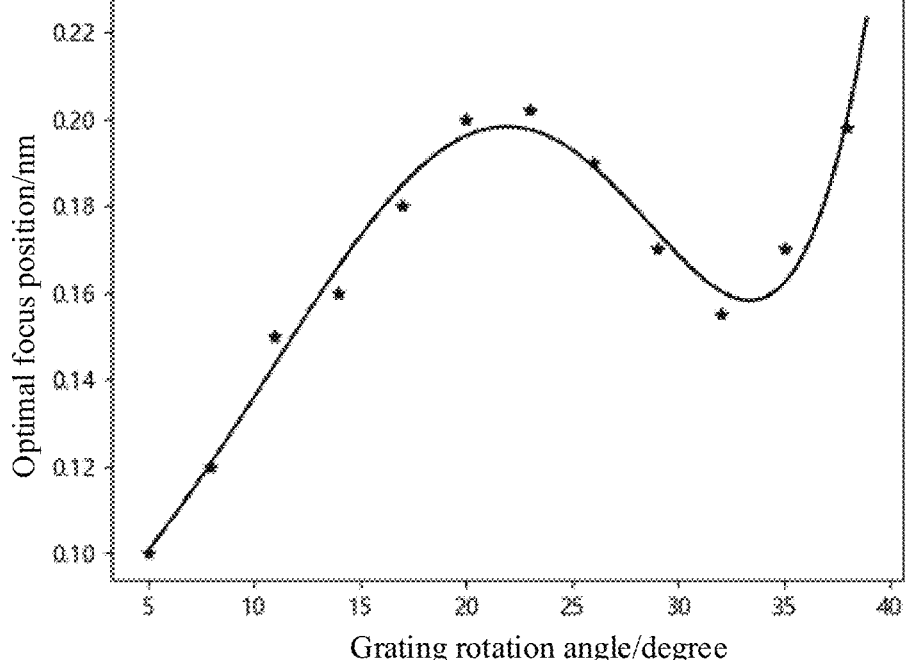
FIG. 5 illustrates a schematic diagram of a relationship
between different angles of a grating and optimal focus
positions according to an embodiment of the present disclo-
sure.

FIG. 5 illustrates a schematic diagram of a relationship between different angles of a grating and an optimal focus position according to an embodiment of the present disclosure. As illustrated in FIG. 5, several positions are selected within a rotatable range of the grating, and above step is repeated to record the optimal focal length positions to obtain a relationship between the grating rotation angles (equivalent to different central wavelengths) and the optimal focal length positions, and the points in FIG. 5 are measured values and the curve is obtained by performing fourth-order polynomial fitting on the data points, and polynomial coefficients are obtained after fitting and saved in the controller.

When the spectrometer moves the central wavelength, the grating rotates by a known angle (the spectrometer itself outputs different wavelengths by controlling the grating rotation angle). The optimal imaging element position at this angle is calculated using the coefficient in the controller, and the sliding table is controlled to move. The moving process of the sliding table may be synchronized with the rotation process of the grating, so that after the rotation of the grating, the imaging element reaches its position synchronously or in advance, which does not affect the overall running time of the spectrometer. The above steps are repeated for other gratings and corresponding coefficients are saved. When the spectrometer has a plurality of entrances or exits, the above steps are repeated, and all the coefficients of the grating in this configuration are recorded.

4. Determining the rotation angle position graph used by the spectrometer based on the position of the entrance optical element and the position of the exit optical element.

5. Determining the optimal imaging element position from the rotation angle position graph based on the grating rotation angle data.

6. Moving the imaging element according to the optimal imaging element position to realize autofocus.

To sum up, the autofocus function of the spectrometer according to the embodiment of the present disclosure is realized by the forward and backward displacement of the imaging element mounted on the linear sliding table. In order to keep the spectrometer at the optimal imaging position at all times, it is necessary to perform a pre-correction, and the controller automatically adjusts the imaging element position according to the configuration and the operation state of the spectrometer after pre-correction, so that the spectrometer can be automatically kept at the optimal imaging position. According to the present disclosure, the spectrometer can still work in the most ideal working state under the conditions of mechanical errors, component differences and various configurations, and exert the best performance of the spectrometer.

The specific embodiments described above further illustrate the objectives, technical solutions and advantageous effects of the present disclosure in detail. It should be understood that those described above are merely specific embodiments of the present disclosure rather than limitations to the protection scope thereof. Any modification, equivalent substitution, improvement, etc. made within the spirit and principle of the present disclosure should fall within the protection scope of the present disclosure.

What is claimed is:

1. An auto-focus spectrometer, comprising:
a grating element configured to split light;
an imaging element configured to converge a light beam;
a controller configured to move the imaging element to realize autofocus, and connected to the imaging element;
a detector;
a collimating element configured to collimate light;
a spectrometer housing;
at least one incident slit and at least one outgoing slit that are provided on the spectrometer housing;
an entrance optical element configured to allow the light passing through the incident slit to enter the collimating element; and
an exit optical element configured to allow the light from the imaging element to enter the detector through the outgoing slit,

wherein an incident light is diffracted through the grating to the imaging element, and then converged to the detector through the imaging element to obtain spectrogram information, the incident light is collimated through the collimating element and then reflected to the grating, the collimating element, the grating element, the imaging element and the controller are provided in the spectrometer housing, and the detector is provided on the spectrometer housing, the incident light enters the collimating element through one of the at least one incident slit and enters the detector through one of the at least one outgoing slit, wherein the controller is specifically configured to:
acquire grating rotation angle data, a position of the entrance optical element and a position of the exit optical element;
determine a rotation angle position graph based on the position of the entrance optical element and the position of the exit optical element;
determine an optimal imaging element position from the rotation angle position graph based on the grating rotation angle data; and
move the imaging element according to the optimal imaging element position to realize autofocus.

2. The auto-focus spectrometer according to claim 1, further comprising:
a linear sliding table on which the imaging element is mounted.

3. The auto-focus spectrometer according to claim 2, wherein the linear sliding table is in a direction that is consistent with an optical path direction of the imaging element.

4. The auto-focus spectrometer according to claim 1, wherein the controller is further configured to:
acquire a light full width at half maximum of the spectrogram information at each grating rotation angle and a corresponding imaging element position;
construct a relationship curve between the full width at half maximum and the imaging element position based on the light full width at half maximum and the corresponding imaging element position, to determine the optimal imaging element position at each grating rotation angle; and
construct the rotation angle position graph according to the optimal imaging element position at each grating rotation angle.

5. The auto-focus spectrometer according to claim 1, wherein the grating element is a planar grating, or a grating turret comprising a plurality of gratings.

* * * * *